United States Patent
Bayer et al.

[11] Patent Number: 6,088,320
[45] Date of Patent: Jul. 11, 2000

[54] MICRO-MECHANICALLY FABRICATED READ/WRITE HEAD WITH A STRENGTHENING SHELL ON THE TIP SHAFT

[75] Inventors: Thomas Bayer, Aidlingen; Johann Greschner, Pliezhausen; Helga Weiss, Gechingen, all of Germany

[73] Assignee: International Business Machines Corporation, Armonk, N.Y.

[21] Appl. No.: 08/803,171

[22] Filed: Feb. 19, 1997

[51] Int. Cl.[7] .............................. H01J 37/00; G11B 7/00
[52] U.S. Cl. .................... 369/101; 369/126; 250/306; 250/423 F
[58] Field of Search ...................... 369/101, 126, 369/47, 170, 171; 250/306, 423 F; 216/2; 430/324, 320, 323

[56] References Cited

U.S. PATENT DOCUMENTS

| | | | |
|---|---|---|---|
| 4,968,585 | 11/1990 | Albrecht et al. | 430/320 |
| 5,116,462 | 5/1992 | Bartha et al. | 216/2 |
| 5,166,520 | 11/1992 | Prater et al. | 250/306 |
| 5,202,004 | 4/1993 | Kwak et al. | 204/153.1 |
| 5,216,631 | 6/1993 | Sliwa, Jr. | 365/174 |
| 5,235,187 | 8/1993 | Arney et al. | 250/306 |
| 5,282,924 | 2/1994 | Bayer et al. | 156/643 |
| 5,283,437 | 2/1994 | Greschner et al. | 250/306 |
| 5,307,311 | 4/1994 | Sliwa, Jr. | 365/174 |
| 5,444,244 | 8/1995 | Kirk et al. | 250/306 |
| 5,455,419 | 10/1995 | Bayer et al. | 250/423 F |
| 5,517,280 | 5/1996 | Quate | 355/71 |
| 5,835,477 | 11/1998 | Binnig et al. | 369/126 |
| 5,856,672 | 1/1999 | Reid | 250/306 |

FOREIGN PATENT DOCUMENTS

| | | | |
|---|---|---|---|
| 0-194323A1 | 9/1986 | European Pat. Off. | G01N 27/00 |
| 0-247219A1 | 12/1987 | European Pat. Off. | G11B 9/00 |
| 0-437275A2 | 7/1991 | European Pat. Off. | G01N 27/00 |
| 0413040A1 | 12/1992 | European Pat. Off. | G01N 27/00 |
| 0413040B1 | 12/1992 | European Pat. Off. | G01N 27/00 |
| 0-584707A2 | 3/1994 | European Pat. Off. | G11B 5/31 |
| 0-617407A2 | 9/1994 | European Pat. Off. | G01B 5/10 |
| 5-6130842 | 10/1981 | Japan | G11B 11/00 |
| 5-7069504 | 4/1982 | Japan | G11B 3/46 |
| 2-243906A | 9/1990 | Japan | G01B 7/34 |

OTHER PUBLICATIONS

"Wear–Tolerant, Fine, Electrical Probe For Data Storage," IBM Technical Disclosure Bulletin, vol. 37 # 07, Jul. 1994, p. 363.

Howe, Roger T., "Surface micromachining for microsensors and microactuators," J. Vac. Sci. Technol. B6(6), Nov./Dec. 1988, pp. 1809–1812.

Primary Examiner—Tan Dinh
Assistant Examiner—Kim-Kwok Chu
Attorney, Agent, or Firm—Noreen A. Krall; William D. Gill

[57] ABSTRACT

A micromechanically fabricated read/write head for charge storage devices comprising a supporting base, a cantilever and a tip with a shaft and frontside end. The supporting base, cantilever and tip form one integral part made of electrically conducting material. The frontside end of the tip is so designed as to allow writing and reading of information in direct contact with the surface of a charge storage device. The shaft of the tip has a small diameter and is surrounded by a strengthening shell.

11 Claims, 3 Drawing Sheets

MICRO-MECHANICALLY FABRICATED READ/WRITE HEAD WITH A STRENGTHENING SHELL ON THE TIP SHAFT

BACKGROUND OF THE INVENTION

1. Field of the Invention

The submitted invention relates to a micromechanically fabricated read/write head for charge storage devices and a method for its manufacture.

2. Description of Prior Art

Based on the scanning tunnel or scanning powered microscope, a series of new types of storage processes have been proposed, such as a nitride-oxide-silicon (NOS) storage device, comprising a silicon substrate, and superimposed thin layers of oxide and nitride. In such a storage device, a charge is inscribed into the thin nitride film with the help of a fine tip. By applying an electrical pulse between the tip and silicon substrate, a charge flows through tunnels through the thin oxide layer into the nitride, and is fixed there. This can be referred to as a writing procedure. The information can also be read again or cancelled with the same tip. With storage elements of this type, storage densities of 30 Gbits/in$^2$ have been achieved in trials with charge surface units of about 150 nm diameter. The available writing and reading structures, and also those inserted, were actually developed as inductive magnetic read/write heads, and thus are not optimally suitable for insertion in NOS storage devices. Their complex construction hardly allows any further reduction of the active read/write surfaces. On grounds of the large lateral dimensions of about 12 mm×600 μm, an arrangement with several read/write heads cannot be realized, which however would be desirable in view of an improved data rate by parallel processing.

A storage device with an arrangement of several read/write heads is described in the U.S. Pat. No. 5,307,311 issued to John W. Sliwa, Jr. The storage device taught therein comprises several cantilevers which store bits, and read/write heads which are located opposite the cantilevers. The read/write heads strongly resemble the tips very strongly in their structure for the scanning tunnel or scanning powered microscopy. By this shape of the tip, through frequent direct contact with the surface of a charge storage device in long term operation, it leads to signs of wear on the tips, resulting in an altered supporting surface, so that the used tip presses with another force on the surface of a charge storage device, in comparison with a perfectly new tip.

It, therefore, can be seen that there is a need for a read/write head for a charge storage device which has a tip capable of reading and writing information in contact with the surface of the charged storage device over long term operation with minimal wear.

SUMMARY OF THE INVENTION

The present invention provides a micromechanically fabricated read/write head for charge storage devices and a method for manufacturing the same. In accordance with the present invention, the micromechanically fabricated read/write head has a tip which is constructed so that it can cope with writing and reading of information in direct contact with the surface of a charge storage device, and also can work reliably in long term operation.

The micromechanically fabricated read/write head for charge storage devices comprises a supporting base, a cantilever and a tip with shaft and a front side end. The supporting base, cantilever and front side end are constructed as an integrated part of electrically conducting material. The frontside end of the tip is so designed, that it can cope with writing and reading of information in direct contact with the surface of a charge storage device. The shaft of the tip has a small diameter and is surrounded by a strengthening shell.

The method for fabricating read/write heads for charge storage devices comprises the following steps:

providing a silicon substrate, covering the substrate with a masking layer forming the masking layer by means of photolithographic processes, forming the shaft of a tip by transferring the mask pattern into the substrate by a reactive ion etching, forming a cantilever and a supporting base from the substrate, thinning the shaft and removing the masking layer.

The thinning of the shaft takes place through thermic oxidation, by the simultaneous growth on the cantilever and the supporting base, one of these two parts is completely enveloped by an oxide layer, and the masking layer prevents the frontside tip from being oxidized. It is thereby guaranteed that the active surface and thus the contact surface pressure always remain constant, in spite of the abrasion which cannot be completely excluded, or the grinding in the operational condition. The quantity of the charge per unit area represented by the written information, therefore always remains constant.

BRIEF DESCRIPTION OF THE DRAWINGS

In what follows, the invention and particular advantageous developments are described more accurately with reference to the diagrams, whereby.

DETAILED DESCRIPTION OF THE INVENTION

Figure 1:
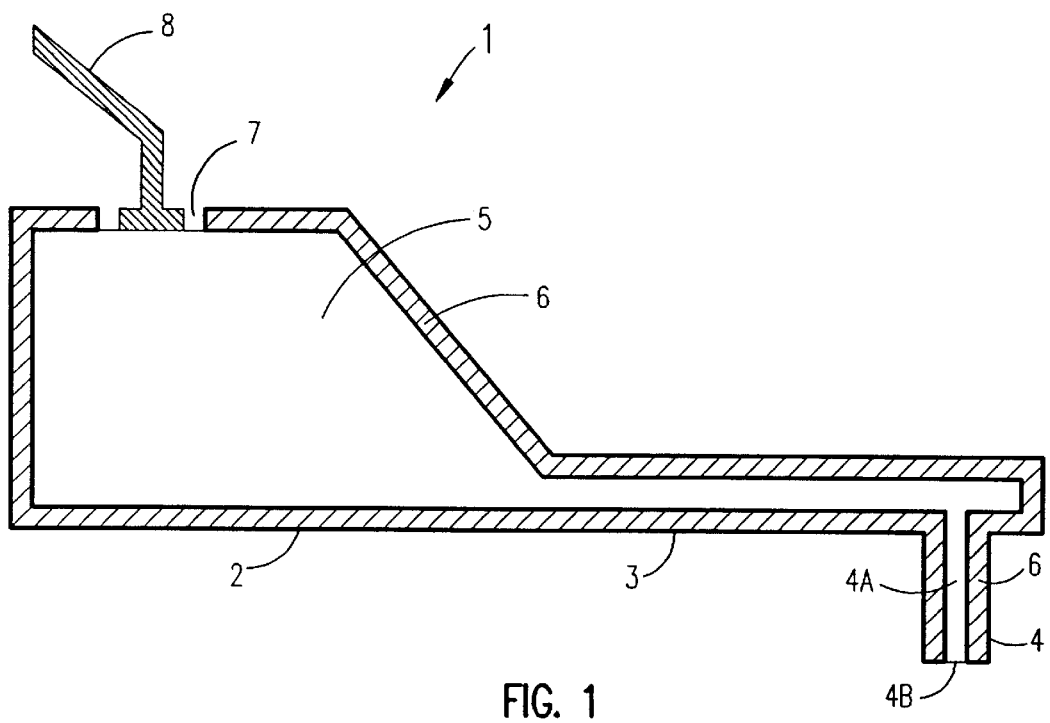
FIG. 1: is a cross-sectional view of the micromechanically fabricated read/write head for charge storage devices in accordance with the present invention.

The schematic cross section representation in FIG. 1 shows a form of construction of read/write heads for charge storage devices fabricated in accordance with the invention according to micromechanical methods. The head 1 comprises a supporting base 2, a cantilever 3 and a tip 4, with a tip shaft 4$a$ and a frontside tip 4$b$. The supporting base 2, cantilever 3 and tip 4 form one integral part 5 made of electrically conducting material. Highly doped silicon is particularly suitable for the purpose, as it can be readily machined by known micromechanical methods.

The shaft 4$a$ has a very small diameter and is surrounded by a strengthening shell 6. The frontside tip end 4$b$ which should be in direct contact with the charge storage device for read in/read out information, should under no circumstances be covered by the strengthening shell 6.

As the tip shaft 4$a$ and the actual active surface of the frontside tip end 4$b$ should be designed to be as thin as possible, the tip 4 without the strengthening shell 6 surrounding the shaft 4b, could easily bend or break off completely when writing or reading in contact with the charge storage device. In that case one would have to reckon with an early clear abrasion or grinding.

The electrically conducting core or tip shaft 4a should have no cross sectional fluctuations occurring along its entire length. Only then can it be ensured that the active surface and thereby contact surface pressure will always remain constant in spite of the abrasion or grinding which can never be completely excluded in the operational condition. In this way it can be ensured that the quantity of the charge per unit area represented by the written information always remains constant. This means that the shaft 4a of the tip 4 should have the side edges as vertical as possible. In the case of extremely small shaft diameters of under 50 nm, values under 20 nm are achieved with ultra-fine tips, and with shaft lengths of about 20 $\mu$m, this represents a ratio of tip length to active tip diameter in the range of about 10.000.

It is important for the tip 4 that its geometric requirements are exactly maintained, whereby the geometry to be adhered to and the engineering production are closely associated.

Figure 5A:
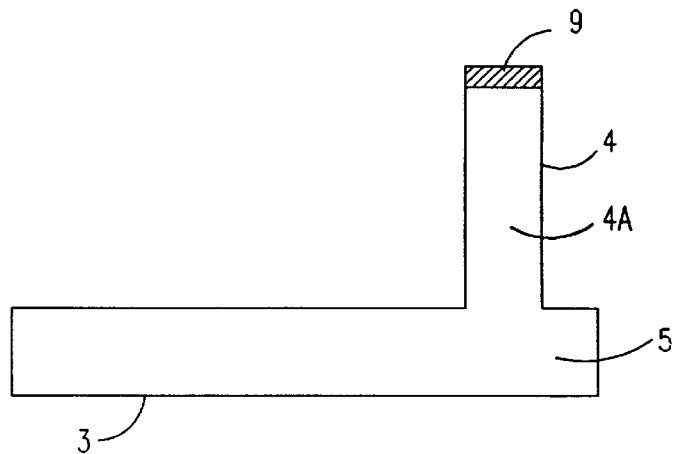
FIGS. 5A–5C: represent important process stages in the fabrication of the read/write heads.

The method for fabrication of the read/write heads in accordance with the present invention is represented in FIGS. 5A, B and C. Other required process stages for fabricating read/write heads which are not germain to the present invention are already described in detail in the European Patent Specification 0 413 040. This application will describe those which are new and novel in the present invention. First, a masking layer is introduced on to a silicon substrate, and the masking layer is textured by means of photolithographic processes to form a mask pattern 9. Subsequently, the mask pattern 9 is transferred into the substrate for the formation of the shaft 4a of a tip 4. Reactive ionic etching is particularly suitable for this process stage. The result of this process stage can be seen in FIG. 5A. Simultaneously with the formation of the tip shaft 4a, or in connection with it, the cantilever 3 and a supporting base 2 are formed from the same substrate.

The shaft 4a is thinned, whereby the thinning is in contrast to the thinning stage in the European Patent Specification 0 413 040 where it takes place by isotropic wet etching, and here it occurs by thermal oxidation. This thinning of the shaft 4a by thermal oxidation, allows a silicon dioxide layer to grow from and on the previously formed shaft of the tip. Through the material conversion of silicon to silicon dioxide which takes place, the shaft diameter shrinks on the one hand, while the thickness of the strengthening shell 6 on the shaft grows correspondingly on the other hand. The finer the active shaft region becomes, the more stable the oxide shell surrounding it becomes simultaneously. The oxide shell can become up to several nm thick. As thermal oxidation forms part of the best controllable processes in micromechanics and microelectronics, shaft diameters clearly smaller than 50 nm can be achieved with this process stage. For example, shaft diameters of about 20 nm can be achieved using this process.

In addition to the mechanical supporting function of the tip shaft 4a, the thick oxide shell 6 also assumes the task of slowing down or even preventing material being abraded off the tip by abrasion or grinding when contacting the surface of charge storage devices.

The contact force is adjusted above all by the rigidity of the cantilever 3. The highest possible contact surface therefore denotes smaller imposed pressure and thereby slower erosion, abrasion or grinding. The contact forces are thereby as in the scanning tunnel or scanning powered microscopy at about $10^{-7}$ to $10^{-9}$ N. In scanning tunnel or scanning powered microscopy, the pressure on the point is, however, unequally higher than the read/write heads described here, whose frontside tips are so shaped that they can enter into direct contact with the surfaces of charge storers.

A short calculation example will cover this. The imposed pressure is $10^{-8}$ N, and the tip cross section (10×10) nm. This ran leads to a surface pressure of about $10^2$ N/mm$^2$. The write/read head described here has an average surface of 3×3 $\mu$m. This leads to a surface pressure of about $10^{-3}$N/mm$^2$. Thus, the surface pressure is $10^5$ smaller than in the case of tips for scanning tunnel or scanning powered micros copy.

Figure 5B:
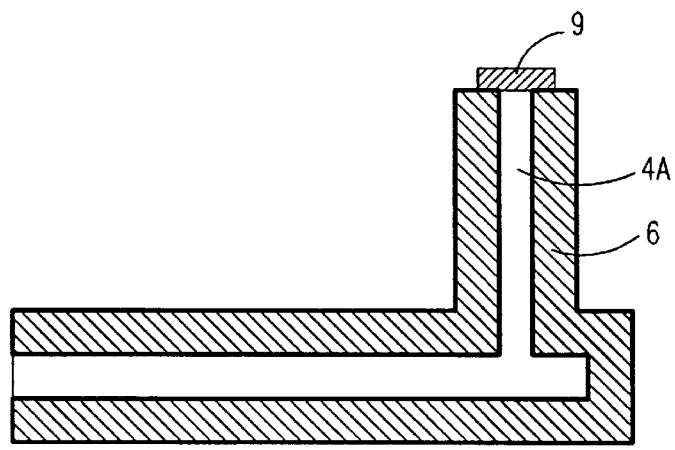

By thermal oxidation, a completely enveloping oxide layer 6 also grows from/on the cantilever 3 and the supporting base 2 on one of these two parts, as represented in FIG. 5B.

Figure 5C:
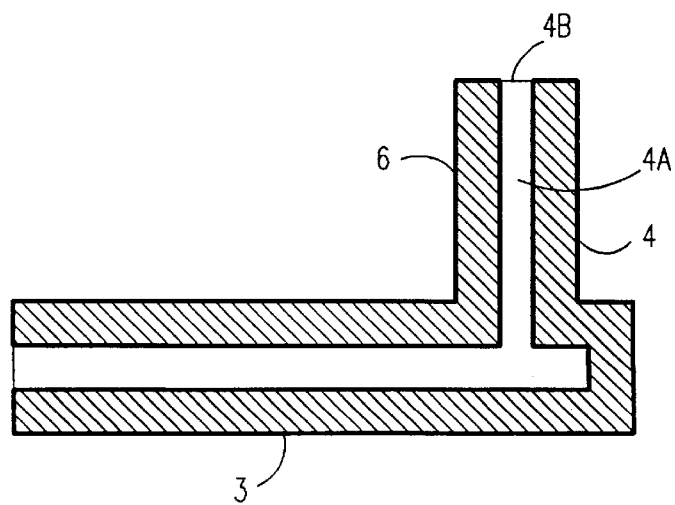

During this oxidation stage by which an oxide shell results with the greatest possible thickness as the masking layer itself, the masking pattern 9 has to ensure that no kind of oxidation takes place on the frontside tip end 4b of the tip 4, and is removed after the oxidation, as illustrated in FIG. 5C. Therefore, it is necessary to select as the masking layer a very dense material which is impenetrable to oxygen molecules. Silicon nitride is particularly suited for this purpose.

Referring back to FIG. 2, the strengthened shell 6 can consist not only of one oxide layer, but can be constructed of several dielectric layers, illustrated here as 6a and 6b. Such a second or further enveloping layer reliably prevents possible abrasion and wear of the tip 4. Diamond-hard carbon is the most suitable for this second or further layers, as under known materials to be applied as a thin layer, it has the best abrasion preventing properties. Equally, the oxide layer or the several dielectric layers, can be covered by a conducting layer, which for example serves for earthing purposes, and facilitates an improved electrical signal guiding.

Figure 2:
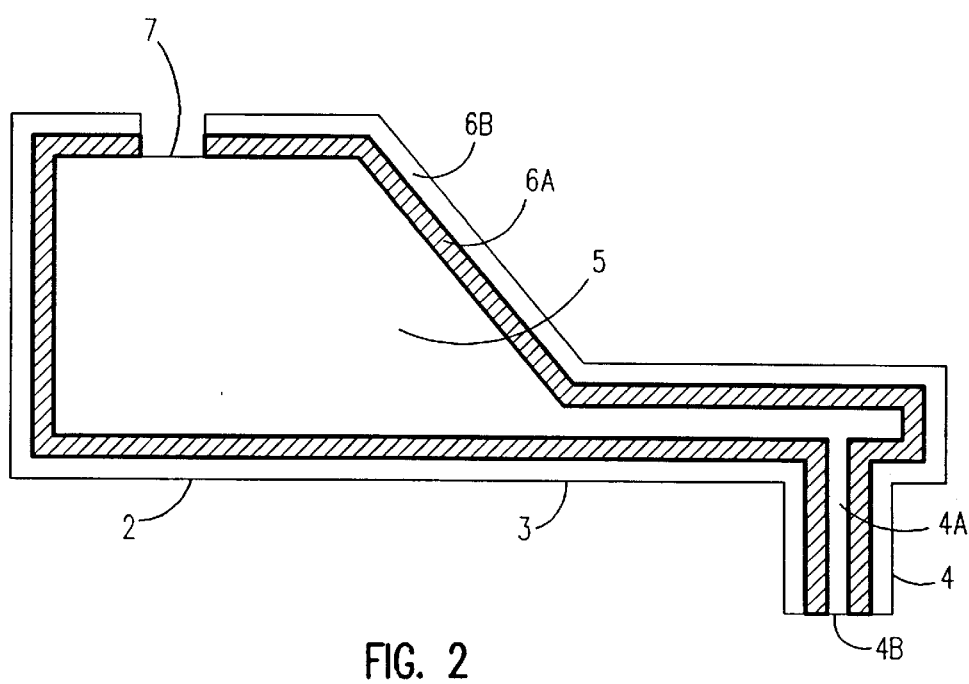
FIG. 2: is a schematic cross-sectional representation of a read/write head showing one of the two layers conprising a strengthening shell.

As can be recognized in FIG. 1 or FIG. 2, the mechanical supporting base 2 has regions 7 which are not covered by the strengthening shell 6. These regions serve for electrically contacting the read/write head 1, and in case of need can introduce hybrid or monolithic trigger and evaluation electronics 8 in these regions. For this purpose, it is necessary to create contact openings passing right through the dielectric or conducting layer 6b and the thermal oxide layer 6a to the silicon substrate in the regions 7 provided in the supporting base 2.

An important factor for a workable storage concept is not only the storage density, but also the data rate when writing and reading. Present day magnetic data storers possess data rates of several MBytes/sec. To reach such data rates, it can be accomplished with the read/write heads presented here, only by means of a targeted simultaneous insertion of a multitude of parallel operating heads as is shown in FIG. 3.

Although the read/write heads described here are mechanically fabricated, arrangements with several read/write heads, shown as reference numeral 10 in FIG. 3, can also be fabricated in a simple way, as was described in connection with FIGS. 5A–5C.

Figure 3:
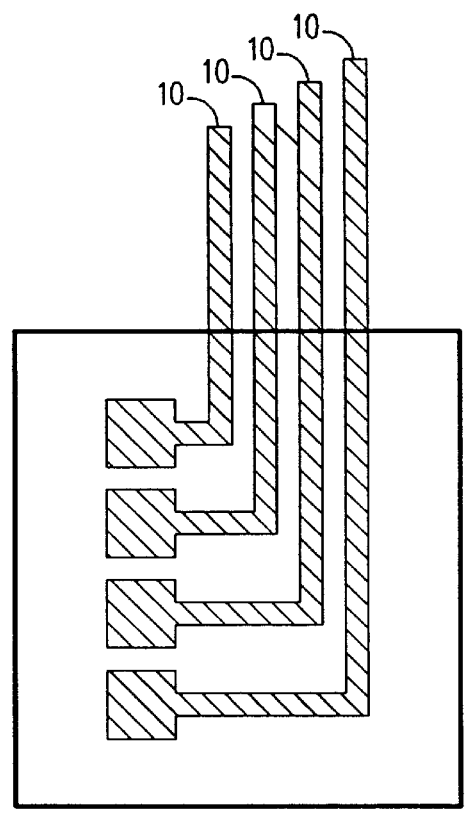
FIG. 3: is a top view of an arrangement with several read/write heads.
Figure 4:
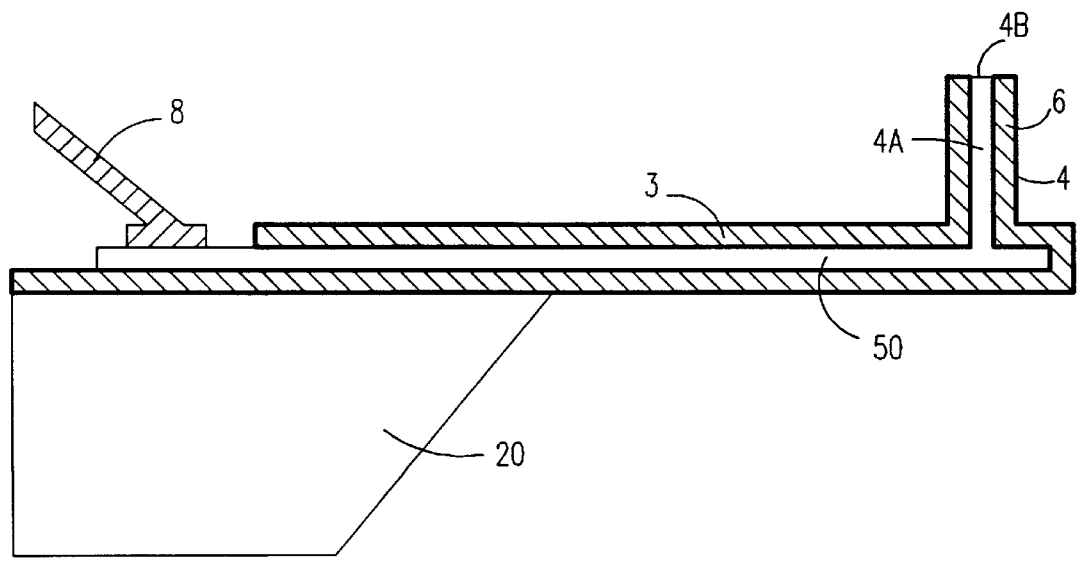
FIG. 4: is a cross-sectional view of the arrangement with several read/write heads shown in FIG. 3.

FIG. 4 is a schematic cross sectional view of the arrangement shown in FIG. 3 having several read/write heads 10. Cantilever 3 and tip 4 of the individual read/write heads 10 are formed as an integral part 50 of electrically conducting material and isolated against the common supporting base 20. The electrodes represented by the individual read/write heads are isolated from the substrate, which can be achieved through a silicon-on-Insulator (SOI) substrate, by which two monocrystalline silicon discs are separated from each other by a thermal oxide.

Individual heads and also arrangements with several read/write heads can be manufactured extremely cheaply by batch fabrication.

We claim:

1. A micromechanically fabricated read/write head for applying charge to a surface of a charge storing device comprising:

a supporting base;

a cantilever having a first end and a second end, said first end connected to the supporting base; and a tip connected to the second end of the cantilever, said tip having a shaft and frontside tip end, wherein the supporting base, the cantilever and the tip form an integral part made of electrically conducting material and the frontside tip end of the tip is so designed as to allow the tip to write and read information in direct contact with the surface of a charge storage device;

wherein the shaft of the tip has a small diameter and is surrounded by a strengthening shell.

2. The read/write head of claim 1 wherein the shaft of the tip has vertical side edges, and the ratio of tip length to tip diameter lies in the region of approximately 10.

3. The read/write head of claim 2 wherein the supporting base and the cantilever are surrounded by the strengthening shell.

4. The read/write head of claim 3 wherein the strengthening shell is fabricated from one or several dielectric layers or from one or several dielectric layers and a superimposed electrically conducting layer.

5. The read/write head of claim 4 wherein the supporting base has a region which is not covered by the strengthening shell, and on which hybrid or monolithic trigger and evaluation electronics are introduced.

6. The read/write head of claim 5 wherein the integral part consists of highly doped silicon, and the dielectric layers of the strengthening shell are made of silicon dioxide and diamond-hard carbon.

7. An arrangement of several read/write heads comprising a supporting base;

a cantilever having a first end and a second end, said first end connected to the supporting base; and a tip connected to the second end of the cantilever, said tip having a shaft and frontside tip end, wherein the cantilever and the tip form an integral part made of electrically conducting material and the frontside tip end of the tip is so designed as to allow the tip to write and read information by applying charge to a surface of a charge storage device;

wherein the shaft of the tip has a small diameter and is surrounded by a strengthening shell, and the cantilever and the tip form an individual read/write head or correspondingly an integral part made of electrically conducting material, and is isolated against the common supporting base.

8. A method for fabricating read/write heads for applying charge to a surface of a charge storage device comprising the following steps:

providing a silicon substrate;

covering the substrate with a masking layer;

forming a mask pattern with photolithographic processes;

forming a shaft of a tip by transferring the mask pattern into the substrate by a reactive etching step;

forming a cantilever and a supporting base from the substrate;

thinning the shaft; and removing the masking layer;

wherein the thinning of the shaft is done by thermal oxidation with an oxide layer completely covering the cantilever and the supporting base being simultaneously grown on the shaft, the cantilever and the supporting base, and with the masking layer preventing the frontside end of the tip from being oxidized.

9. The method of claim 8 wherein the masking layer consists of silicon nitride.

10. The method of claim 9, wherein a further dielectric layer or an electrically conducting layer is introduced on the thermal oxide layer.

11. The method of claim 10, further comprising the step of creating contact openings in the dielectric or electrically conducting layer and the thermal oxide layer, and penetrating through to the silicon substrate in specified regions of the supporting base.

* * * * *